United States Defensive Publication [19] (H) [11] T980,002

Hsieh et al. [43] Mar. 6, 1979

[54] PHOSPHATE FLOTATIONS WITH SATURATED BRANCHED-CHAIN FATTY ACID ISOMERS

[75] Inventors: Shuang-shii Hsieh; James R. Lehr, both of Florence, Ala.

[73] Assignee: Tennessee Valley Authority,

[21] Appl. No.: 854,357

[22] Filed: Nov. 23, 1977

[51] Int. Cl.[2] ..... B03D 1/02

[52] U.S. Cl. ..... 209/166

[57] ABSTRACT

Mixtures of the isomers of $C_{18}$ and $C_{16}$ branched-chain saturated fatty acids have been demonstrated to be satisfactory substitutes as flotation reagents in Florida phosphate rock flotation in place of commercial crude, refined, or blended tall oils, or other straight-chain aliphatic fatty acids derived from vegetive sources in which the unsaturated aliphatic fatty acid components are the principal or most effective flotation reagents, as opposed to the corresponding saturated straight-chain fatty acids. The title reagents consisting of saturated branched-chain fatty acids of similar carbon content ($C_{16}$ - $C_{18}$) can be used alone as acids, or as soap derivatives, or in blended mixtures with fuel oil, which reduces reagent comsumption and also increases the grade and recovery of phosphate concentrate. The selectivity of this new class of fatty-acid collectors has been found to be so superior that acceptable grades of phosphate rock concentrate product can be obtained from low-grade Florida phosphate ore in a single anionic flotation circuit, using flotation feed extending down to 400 mesh, thereby minimizing slime losses of phosphate heretofore wasted.

9 Claims, No Sheets Drawing,

15 Pages Specification

The file of this unexamined application may be inspected and copies thereof may be purchased (849 O.G. 1221, Apr. 9, 1968).